G. J. MAAS.
INSTRUMENT FOR SURVEYING BORE HOLES.
APPLICATION FILED NOV. 11, 1910.

1,003,624.

Patented Sept. 19, 1911.

UNITED STATES PATENT OFFICE.

GEORGE J. MAAS, OF NEGAUNEE, MICHIGAN.

INSTRUMENT FOR SURVEYING BORE-HOLES.

1,003,624.  Specification of Letters Patent.  Patented Sept. 19, 1911.

Application filed November 11, 1910. Serial No. 591,880.

*To all whom it may concern:*

Be it known that I, GEORGE J. MAAS, a citizen of the United States, and resident of Negaunee, in the county of Marquette and State of Michigan, have invented certain new and useful Improvements in Instruments for Surveying Bore-Holes; and I do hereby declare that the following is a full, clear, and exact description thereof.

My invention consists in what is herein particularly set forth with reference to the accompanying drawings and pointed out in claims of this specification, its object being to provide simple, economical and efficient instruments for surveying bore holes in mining engineering to accurately determine the dip and direction of such holes at predetermined depths.

Figure 2:
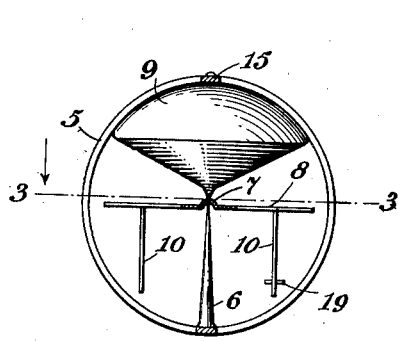
Figure 4:
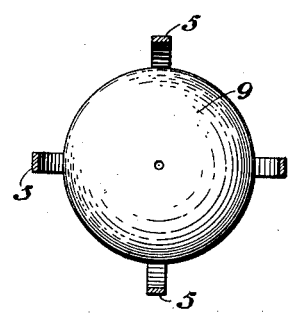
Figure 3:
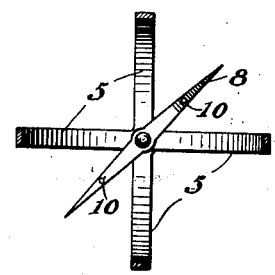
Figure 1:
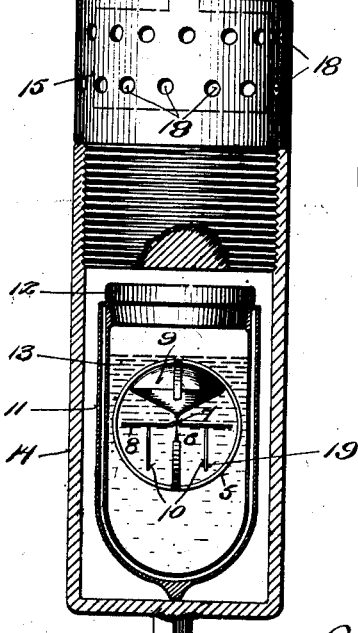

Figure 1 of the drawings represents a vertical central section view of an instrument in accordance with my invention within a protective casing attached to a tubular rod; Fig. 2, an elevation of a detail of the instrument partly in section; Fig. 3, a horizontal section on the plane indicated by line 3—3 in Fig. 2, and illustrates a deflection of a magnetic needle element of said instrument, and Fig. 4, a plan view of said detail of the aforesaid instrument partly in horizontal section.

Referring by numerals to the drawings, 5 indicates each of a pair of crossed circular bands constituting a spherical frame of brass or other suitable non-magnetic material, and mounted upon the bottom of the frame is a central pivot 6 engaging the dab 7 of a magnetic needle 8, said frame, pivot and needle constituting a compass. Secured within the upper portion of the compass-frame is a float 9, which same may be a piece of cork or other suitable buoyant device. It is preferable, as herein shown, to provide the compass-needle with a pair of depending pins 10 in opposite directions from the pivot 6, the purpose of these pins being hereinafter specified.

The buoyant compass is inclosed within a suitable receptacle 11, the same being preferably what is known as a "thermos" bottle, for which a suitable stopper 12 is provided. The receptacle 11 is also designed to contain gelatin or other suitable transparent congealable substance 13, and this substance being liquefied, the compass is primarily floated therein below the surface of the same, the magnetic-needle 8 being horizontal regardless of the angle at which the receptacle 11 may be held.

The aforesaid receptacle and its contents is shown within a protective casing 14 of brass or other suitable non-magnetic material having a screw-stopper 15 provided with a screw-shank 16 that engages the lower end of a rod 17 also of suitable non-magnetic material designed for connection at its upper end with the lowermost section of an ordinary mining drill-rod, the non-magnetic rod being preferably tubular throughout its length and of a length sufficient to prevent the magnetism of the drill-rod from disturbing the compass in said receptacle. The thread of the casing 14 and its stopper 15 is sufficiently long and fine as to prevent water finding its way into said casing when the same is closed. The casing is also strong enough to prevent its collapse under water-pressure in bore holes. A portion of the casing plug 15 and its shank 16 are preferably tubular, in line with the bore of the non-magnetic rod aforesaid, the bore of the plug being intersected by outlet apertures 18.

In practice, the stoppered transparent receptacle 11, containing the compass submerged in the then liquefied transparent substance 13, is preferably wrapped in tinfoil and placed within its protective casing to be lowered in a bore-hole subsequent to the attaching of said casing to a non-magnetic continuation of an ordinary drill-rod, as herein shown and described, or, for some tests, to a wire of suitable material and gage. If a wire be employed, the same should be non-magnetic for a suitable distance outward from the aforesaid casing. When lowered to the desired depth, the incased receptacle 11 and its contents are left long enough for the liquefied substance 13 to congeal and set the compass-needle in fixed position on its pivot.

Should the water in a bore-hole be hot, as sometimes happens, cold water may be pumped down the tubular drill-rods and the continuation 17 of the same to pass out through the openings 18 in the casing-plug 15 to thereby effect a cooling of said plug as well as the casing and its contents, whereby the substance 13 has an opportunity to congeal in the incased receptacle 11.

Because of the pins 10 depending from the compass-needle, the center of gravity of said needle is lowered, whereby it stays better on its pivot and swings better upon the same. The pins also serve to anchor the compass-needle in the transparent substance as it transforms from a liquid to a congealed state, and should there be an attraction of magnetic ore or of a magnetic schist tending to tilt said needle on its pivot, said pins act as an automatic equalizer. For example: If there is a tendency of the needle to tilt, one of the pins will tend to approach toward the pivot and the other to recede therefrom in the same proportion, whereby a leverage is obtained that tends to overcome attraction from above or below.

When the instrument, comprising the transparent receptacle 11 and its contents, is removed from the casing 14, after a test of a bore-hole as above described, said instrument is to be held so that the compass-needle 8, set in the congealed transparent substance 13, will be horizontal and pointing north and south, then the angle of said receptacle or the mass of the congealed substance to said compass-needle will indicate the dip and direction of the bore-hole at the predetermined depth.

To facilitate reading through the transparent substance 13, the depending north pin of the magnetic needle may be provided with a cross-pin 19, as shown.

I claim:

1. A bore-hole surveying-instrument comprising a suitable receptacle, a transparent congealable substance in the receptacle, a pivot-supporting frame floated in said substance, and a submerged magnetic-needle on the pivot to have free swing in a horizontal plane while said substance is in a liquid state.

2. A bore-hole surveying-instrument comprising a suitable receptacle, a transparent congealable substance in the receptacle, a pivot-supporting frame floated in said substance, a submerged magnetic-needle on the pivot to have free swing in a horizontal plane while said substance is in a liquid state, and balancing pins depending from the needle on opposite sides from said pivot.

3. A bore-hole surveying-instrument comprising a transparent receptacle, a transparent congealable substance in the receptacle, a float-carrying spherical frame in said substance, a pivot rising from the bottom of the frame, and a submerged magnetic-needle on the pivot.

4. A bore-hole surveying-instrument comprising a transparent receptacle, a transparent congealable substance in the receptacle, a float-carrying spherical frame in said substance, a pivot rising from the bottom of the frame, a submerged magnetic needle on the pivot, and balancing pins depending from the needle on opposite sides from said pivot.

5. A bore-hole surveying instrument comprising a transparent receptacle, a transparent congealable substance in the receptacle, a frame floated in said substance, a magnetic needle supported in said frame, and balancing pins depending from the needle on opposite sides from its support.

In testimony that I claim the foregoing I have hereunto set my hand at Negaunee in the county of Marquette and State of Michigan in the presence of two witnesses.

GEORGE J. MAAS.

Witnesses:
J. M. PERKINS,
THOMAS GRIBBLE.